US007102325B2

(12) United States Patent
Vertanen

(10) Patent No.: US 7,102,325 B2
(45) Date of Patent: Sep. 5, 2006

(54) METHOD FOR DETERMINING ROTOR FLUX VECTOR OF AC ELECTRICAL MACHINE

(75) Inventor: Mikko Vertanen, Espoo (FI)

(73) Assignee: ABB Oy, Helsinki (FI)

( * ) Notice: Subject to any disclaimer, the term of this patent is extended or adjusted under 35 U.S.C. 154(b) by 0 days.

(21) Appl. No.: 11/170,646

(22) Filed: Jun. 30, 2005

(65) Prior Publication Data

US 2006/0006835 A1    Jan. 12, 2006

(30) Foreign Application Priority Data

Jul. 1, 2004    (EP)    ............................ 04103106

(51) Int. Cl.
*H02P 23/00*    (2006.01)
(52) U.S. Cl. ...................... 318/807; 318/801; 318/700; 318/727; 318/701
(58) Field of Classification Search ................ 318/807, 318/801, 700, 727, 701, 439, 432, 138, 799, 318/802, 798; 363/132
See application file for complete search history.

(56) References Cited

U.S. PATENT DOCUMENTS

| 2003/0169015 A1* | 9/2003 | Royak et al. ............... 318/727 |
| 2005/0110450 A1* | 5/2005 | Stancu et al. ............... 318/609 |

OTHER PUBLICATIONS

Shyh-Shing Perng et al.; "Sensorless vector controller for induction motor drives with parameter identification" Industrial Electronics Society, 1998; vol. 2, pp. 1008-1013; Aug. 31, 1998.

Umanand L., et al., "Online estimation of stator resistance of an induction motor for speed control applications"; IEE Proceedings: Electric Power Applications, Institutions of Electrical Engineers; vol. 142, No. 2 pp. 97-103.

Hamajima, T; et al., "Sensorless Vector Control of Induction Motor with Stator Resistance Identification Based on Augmented Error", Proceedings of the Power Conversion Conference 2002, Apr. 2, 2002, pp. 504-509.

Aktas, Mustafa et al.; "Neural Network Based Stator Resistance Estimation in Direct Torque Control of Induction Motor"; IJCI Proceedings of Intl. XII. Turkish Symposium on Artificial Intelligence and Neural Networks, vol. 1, No. 1. Jul. 2003, pp. 355-358.

* cited by examiner

*Primary Examiner*—Karen Masih
(74) *Attorney, Agent, or Firm*—Buchanan Ingersoll & Rooney PC

(57) ABSTRACT

A method for determining the rotor flux vector of an electrical machine, the method comprising the steps of controlling the electrical machine with an inverter, forming an equation for the reactive power ($Q_{inv}$) at the output of the inverter, forming an equation for the consumed reactive power ($\hat{Q}_{mot}$) in the electrical machine, forming a reactive power balance equation ($Q_{err}$) between the reactive power ($Q_{inv}$) at the output of the inverter and the reactive power ($\hat{Q}_{mot}$) consumed in the electrical machine, determining the stator resistance ($\hat{R}_s$) of the electrical machine from the balance equation ($Q_{err}$), determining the stator flux estimate ($\hat{\psi}_s$) using the determined stator resistance ($\hat{R}_s$) and the balance equation ($Q_{err}$), and determining the rotor flux estimate ($\hat{\psi}_R$) using the determined stator flux estimate ($\hat{\psi}_s$).

10 Claims, 1 Drawing Sheet

METHOD FOR DETERMINING ROTOR FLUX VECTOR OF AC ELECTRICAL MACHINE

FIELD OF THE INVENTION

The present invention relates to a method for determining the rotor flux vector of an AC electrical machine. More specifically, the invention relates to a method which can be used in connection with rotating electrical machines to determine the rotor flux vector during the use of the electrical machine without any rotational speed or position sensors.

BACKGROUND OF THE INVENTION

In modern electrical machine control systems, it is known to use a mathematical model of the machine as a basis for the control. These models, which comprise accurate mathematical equations and parameters of the machine, produce information concerning the electrical state of the machine for the control system. Many such models require accurate parameter values from the electrical machine. These parameters should be identified before use for every machine, since the values can differ greatly from machine to machine. One of these values that should be identified before or during the use of the machine is the value of stator resistance $R_s$.

The importance of the correctness of the estimation of the stator resistance arises from the fact, that the stator resistance is used in connection with the estimation of the stator flux. The stator flux is in turn used together with the rotor flux in various control topologies as controlled variables which should be as accurate as possible. The stator flux is usually calculated using a stator differential equation in the form of $$\psi_s = \int u_s - R_s i_s dt. \quad (1)$$

If the estimate for the stator resistance is not accurate, the calculation using integral drifts and causes erroneous results for the stator flux and rotor flux. This will in turn influence on the reliability of the whole control of the machine.

The stator resistance can be directly measured from stator windings before the start-up of the machine. There are also numerous methods for estimating the resistance during the use of the machine. Since the stator resistance is temperature dependent, the value of the resistance should be estimated quite often.

Document M. Aktas, H. I. Okumus: *Neural network based stator resistance estimation in direct torque control of induction motor*, IJCI Proceedings of Intl. XII Turkish Symposium on Artificial Intelligence and Neural Networks, Vol. 1, No: 1, July 2003, discloses a method for determining the stator resistance using active power balance equation. The balance equation is used in the document as an input to a resistance adaptation mechanism which is implemented as a neural network. The use of the active power produces results which are not satisfactory especially in the regenerating mode.

The problem in the known methods for determining the rotor flux is the inaccuracy which results mostly from inaccurate determination of the stator resistance and thus from erroneous stator and rotor fluxes.

BRIEF DESCRIPTION OF THE INVENTION

An object of the present invention is to provide a method so as to solve the above problem and to estimate the rotor flux accurately irrespective of the electrical state of the machine. The object of the invention is achieved by a method which is characterized by what is stated in the independent claim. The preferred embodiments of the invention are disclosed in the dependent claims.

The method of the invention is based on the idea that a reactive power balance equation is formed between the output of the inverter and the machine. This equation or error of reactive power is used as an input for the adaptation mechanism of the stator resistance. The same reactive power balance equation is also used as a correction term for the calculation of the stator flux vector.

By using the method of the invention, an accurate estimate of the rotor flux is achieved. The estimation is robust in low stator frequencies and in the regenerating mode operation both in static and dynamic circumstances. The method is also insensitive to the temperature because the resistance is on-line estimated. The method of the invention needs only total leakage inductance as a parameter. However, the method is not sensitive to a possible estimation error of the leakage inductance.

These advantages make it possible to control electrical machines reliably using methods, which are based on the information of the rotor flux.

BRIEF DESCRIPTION OF THE DRAWINGS

In the following, the invention will be described in greater detail by means of preferred embodiments with reference to the attached drawings, in which.

DETAILED DESCRIPTION OF THE INVENTION

Figure 1:
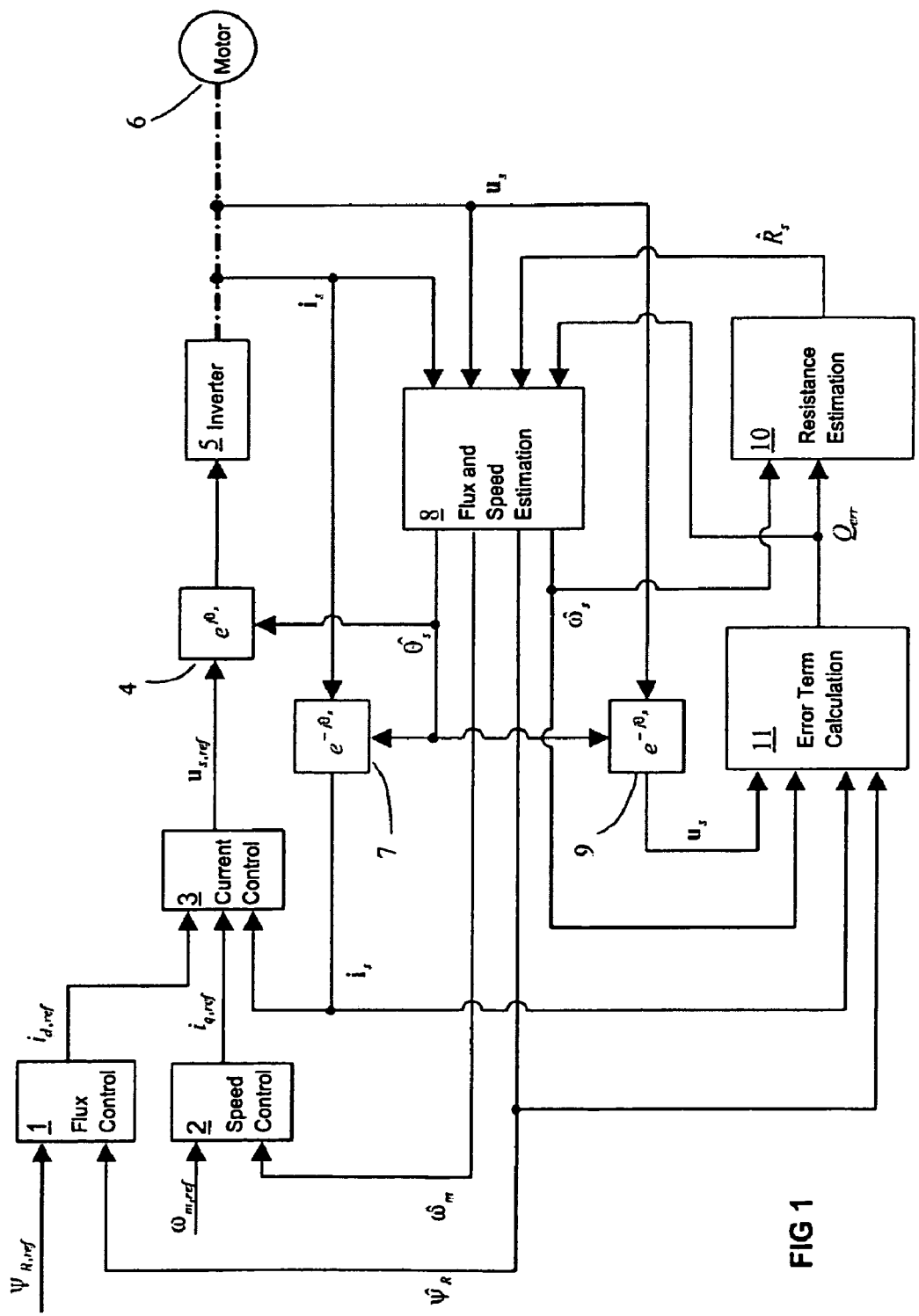
FIG. 1 shows a block diagram of a vector control system of an induction motor using the method according to the present invention.

FIG. 1 shows a block diagram which is used to illustrate the method of the invention in connection with an induction motor. The block diagram has rotor flux amplitude reference $\psi_{R,ref}$ and mechanical angular frequency reference $\omega_{m,ref}$ as input variables. Flux and speed estimation block 8 produces estimates for both rotor flux amplitude $\hat{\psi}_R$ and mechanical angular frequency $\hat{\omega}_m$ as will be explained below. It should be noted that reference values inputted to the block diagram of FIG. 1 may be produced from an upper level control circuit, which is not shown.

At its input, flux control block 1 receives rotor flux amplitude reference $\psi_{R,ref}$ and an estimate for rotor flux amplitude $\hat{\psi}_R$ and produces a reference for the direct-axis component of stator current $i_{d,ref}$ at its output. Similarly, speed control block 2 receives mechanical angular frequency reference $\omega_{m,ref}$ and estimated mechanical angular frequency $\hat{\omega}_m$ as inputs, and outputs a reference value for the quadrature-axis component of stator current $i_{q,ref}$. Current references are thus produced in a normal manner in a rotor flux co-ordinate system.

These current references are further fed to a current control block 3 together with stator current vector $i_s$, which has been converted to the rotor flux co-ordination system using co-ordinate conversion block 7. Current controller 3 produces a reference value for stator voltage vector $u_{s,ref}$ in the rotor flux reference frame. This voltage vector is then converted back to stationary co-ordinates and fed to an inverter 5 which implements the voltage reference and controls the motor 6 according to rotor flux amplitude reference $\psi_{R,ref}$ and mechanical angular frequency reference $\omega_{m,ref}$.

According to the method of the invention, an equation for the reactive power at the output of the inverter $Q_{inv}$ is formed.

$$Q_{inv} = u_s \times i_s = u_x i_y - u_y i_x = u_d i_q - u_q i_d \qquad (2)$$

The reactive power can be presented as a cross-product between stator voltage vector $u_s$ and stator current vector $i_s$. Stator current is usually measured by measuring the current flowing from the inverter to the electrical machine. Similarly, voltage can be directly measured or determined from the switch positions of the inverter together with the information on the voltage of the intermediate circuit. However, all possible known methods for determining the voltage and current vectors are usable. In equation (2), the reactive power is also written in a component form both in the stator co-ordinate system (xy-components) and in the rotor flux co-ordinate system (dq-components).

Further, the method comprises a step in which an equation for the consumed reactive power in the electrical machine $\hat{Q}_{mot}$ is formed.

$$\hat{Q}_{mot} = \hat{\omega}_s L_\sigma (i_d^2 + i_q^2) + \hat{\omega}_s \hat{\psi}_R i_d + L_\sigma (i_d \dot{i}_q - i_q \dot{i}_d) - i_q \dot{\hat{\psi}}_R \qquad (3)$$

where,
$\hat{\omega}_s$ is an estimate for the rotor flux angular frequency,
$L_\sigma$ is the stator leakage inductance,
$\hat{\psi}_R$ is an estimate for the rotor flux amplitude, and
a dot above a symbol represents a derivative operation.

Equation (3) for the reactive power of the motor is represented using dq-components. It should, however, be noted that also xy-components could be used. Stator leakage inductance $L_\sigma$ is estimated using a suitable method.

Since the reactive power at the output of the inverter and at the motor should be equal, it is possible to create a reactive power balance equation, i.e. error term $Q_{err}$ which is the sum of the two reactive power equations. If all terms in these equations (2) and (3) are correct, the sum should be zero, which means that all the reactive power produced by the inverter is consumed in the electrical machine.

$$Q_{err} = Q_{inv} + \hat{Q}_{mot} = u_d i_q - u_q i_d + \hat{\omega}_s L_\sigma (i_d^2 + i_q^2) + \hat{\omega}_s \hat{\psi}_R i_d + L_\sigma (i_d \dot{i}_q - i_q \dot{i}_d) - i_q \dot{\hat{\psi}}_R \qquad (4)$$

Since in real world this equation (4) holds, it is apparent that if error term $Q_{err}$ differs from zero, some corrections should be done. These corrections are carried out in the method of the invention by determining stator resistance $\hat{R}_s$ of the electrical machine from the balance equation i.e. error term $Q_{err}$, and by determining stator flux estimate $\hat{\psi}_s$ using the determined stator resistance and the balance equation.

According to a preferred embodiment of the invention, the balance equation is inputted to a resistance adaptation mechanism. One simple and efficient form of this adaptation mechanism is an integrator $$\hat{R}_s = k_i \mathrm{sgn}(\hat{\omega}_s) \int_{\Delta T} Q_{err} dt \qquad (5)$$

which produces an estimate for stator resistance which is used in flux estimation. In equation (5), the error term is integrated and multiplied by constant multiplier $k_i$ and by the sign of the angular speed of the rotor flux. Term $k_i$ is the integrator gain and the sign is used to take into account the rotational direction.

According to the method of the invention, the stator differential equation, which is corrected by the balance equation, is used for determining the stator flux vector.

$$\dot{\hat{\psi}}_s = u_s - \hat{R}_s i_s' - k_p \mathrm{sgn}(\hat{\omega}_s) Q_{err} i_s \qquad (6)$$

Equation (6) is shown in differential form and in a stator co-ordinate system. The derivate of the stator flux vector is obtained according to (6) by subtracting from the stator voltage vector the product of the estimate for the stator resistance and stator current vector, and further subtracting the balance equation multiplied by constant $k_p$ and by the sign of the rotor flux frequency. Balance equation (4) is thus used both in the estimation of the stator resistance and in the estimation of the stator flux.

Rotor flux $\hat{\psi}_R$ is further determined in a stationary co-ordination system.

$$\hat{\psi}_R = \hat{\psi}_s - L_\sigma i_s \qquad (7)$$

The rotor flux is obtained in a conventional manner by subtracting the product of the stator current and leakage inductance from the determined stator flux.

Further, the rotor flux angle for the rotor flux oriented vector control can be calculated according to $$\hat{\theta}_s = \arctan\left(\frac{\hat{\psi}_{Ry}}{\hat{\psi}_{Rx}}\right), \qquad (8)$$

where $\hat{\psi}_{Rx}$ and $\hat{\psi}_{Ry}$ are the rectangular components of the rotor flux expressed in stator co-ordinates. The angular frequency of the rotor flux vector can be obtained from the rotor flux angle using derivation in a known manner. Further, the slip frequency of the machine can be calculated in a known manner. By using the slip frequency and the angular frequency of the rotor flux, one can easily calculate an estimate for the actual mechanical angular speed $\hat{\omega}_m$ of the rotor.

The rotor flux amplitude i.e. d-component in rotor flux co-ordination, can be calculated according to equation (9) by turning the rotor flux to the direction of the calculated rotor flux angle and taking the real part thereof $$\hat{\psi}_R = \mathrm{Re}\{e^{-j\hat{\theta}_s}\hat{\psi}_R\}. \qquad (9)$$

Now turning back to FIG. 1, flux and speed estimation block 8 produces rotor flux angle $\hat{\theta}_s$, mechanical angular speed $\hat{\omega}_m$, rotor flux amplitude $\hat{\psi}_R$ and rotor flux angular speed $\hat{\omega}_s$ estimates from stator current vector $i_s$, stator voltage vector $u_s$, estimated stator resistance $\hat{R}_s$ and balance equation $Q_{err}$. Flux and speed estimation block 8 thus implements equations (6), (7), (8) and (9).

Block 11 of FIG. 1 is a reactive power error term calculation block, which outputs the error term or balance equation $Q_{err}$ which is constructed of equations (2), (3) and (4). The inputs for this block 11 are the angular speed of the rotor flux $\hat{\omega}_s$, rotor flux amplitude $\hat{\psi}_R$, stator current $i_s$ and stator voltage $u_s$. The stator current and voltage are transferred to the rotor flux reference frame by transfer blocks 7 and 9, and calculations are carried out in component form as shown in the equations.

Error term $Q_{err}$ from block 11 and the angular speed of the rotor flux $\hat{\omega}_s$ from block 8 are fed into resistance estimation block 10. Error term $Q_{err}$ is also fed into flux and speed estimation block 8. Block 10 implements equation (5) for carrying out the estimation of stator resistance $\hat{R}_s$, which in turn is fed into block 8 of FIG. 1.

In operation, error term $Q_{err}$ corrects the stator flux directly as a correction term and by the estimated resistance as can be seen from FIG. 1 and equations (5) and (6). Whenever the error term departs from zero, the stator flux is corrected. When the estimated stator flux corresponds to the actual stator flux in the electrical machine, the error term is zero and corrections are not needed. At the same time, the estimate for the stator resistance has stabilized.

It should be noted that the method of the invention is most suitably used in connection with induction machines. The method of the invention is also suitable for use in connection with synchronous machines with some slight modifications in some equations.

It should further be noted, that the equations presented in the specification and claims can be modified in numerous ways. The equations thus only show one possible way of carrying out the calculations. These modifications also include the possibility of co-ordinate transformation. The examples in the specification are the most commonly used variants of the equations.

It will be obvious to a person skilled in the art that, as the technology advances, the inventive concept can be implemented in various ways. The invention and its embodiments are not limited to the examples described above but may vary within the scope of the claims.

The invention claimed is:

1. A method for determining the rotor flux vector of an electrical machine, characterized by
controlling the electrical machine with an inverter,
forming an equation for the reactive power ($Q_{inv}$) at the output of the inverter,
forming an equation for the consumed reactive power ($\hat{Q}_{mot}$) in the electrical machine,
forming a reactive power balance equation ($Q_{err}$) between the reactive power ($Q_{inv}$) at the output of the inverter and the reactive power ($\hat{Q}_{mot}$) consumed in the electrical machine,
determining the stator resistance ($\hat{R}_s$) of the electrical machine from the balance equation ($Q_{err}$)
determining the stator flux estimate ($\hat{\psi}_s$) using the determined stator resistance ($\hat{R}_s$) and the balance equation ($Q_{err}$) and
determining the rotor flux estimate ($\hat{\psi}_R$) using the determined stator flux estimate ($\hat{\psi}_s$).

2. A method according to claim 1, characterized by the method further comprising
determining the output voltage ($u_s$) and output current ($i_s$) of the inverter and
forming a cross-product between the output voltage and output current as the equation for the reactive power ($Q_{inv}$) at the output of the inverter.

3. A method according to claim 1, characterized in that the equation for the consumed reactive power in the electrical machine is independent of the stator resistance.

4. A method according to claim 3, characterized in that the equation for the consumed reactive power in a rotor flux co-ordinate system is $$\hat{Q}_{mot}=\hat{\omega}_s L_\sigma(i_d^2+i_q^2)+\hat{\omega}_s\hat{\psi}_R i_d+L_\sigma(i_d\dot{i}_q-i_q\dot{i}_d)-i_q\hat{\dot{\psi}}_R.$$

5. A method according to claim 1, characterized in that the balance equation is $$Q_{err}=Q_{inv}+\hat{Q}_{mot}=u_d i_q-u_q i_d+\hat{\omega}_s L_\sigma(i_d^2+i_q^2)+\hat{\omega}_s\hat{\psi}_R i_d+L_\sigma(i_d\dot{i}_q-i_q\dot{i}_d)-i_q\hat{\dot{\psi}}_R.$$

6. A method according to claim 1, characterized in that the step of determining the stator resistance of the electrical machine from the balance equation comprises a step in which the error term from the balance equation is inputted to a stator resistance adaptation mechanism.

7. A method according to claim 1, characterized in that the step of determining the stator resistance of the electrical machine from the balance equation ($Q_{err}$) comprises a step in which the balance equation is integrated and multiplied with a constant multiplier.

8. A method according to claim 1, characterized in that the determination of the stator flux estimate using the determined stator resistance and the balance equation ($Q_{err}$) is done by using a stator differential equation corrected by the balance equation.

9. A method according to claim 1, characterized in that the determination of the stator flux estimate is done by using equation $$\hat{\dot{\psi}}_s=u_s-\hat{R}_s i_s-k_p sgn(\hat{\omega}_s)Q_{err}i_s.$$

10. A method according to claim 1, characterized in that the determination of the rotor flux estimate using the determined stator flux estimate is done by using equation $\hat{\psi}_R=\hat{\psi}_s-L_\sigma i_s$.

* * * * *